F. C. COSEO.
ELECTRIC LOCOMOTIVE AND CABLE REELING MECHANISM.
APPLICATION FILED DEC. 18, 1905. RENEWED AUG. 11, 1908.
1,160,857.
Patented Nov. 16, 1915.
4 SHEETS—SHEET 1.
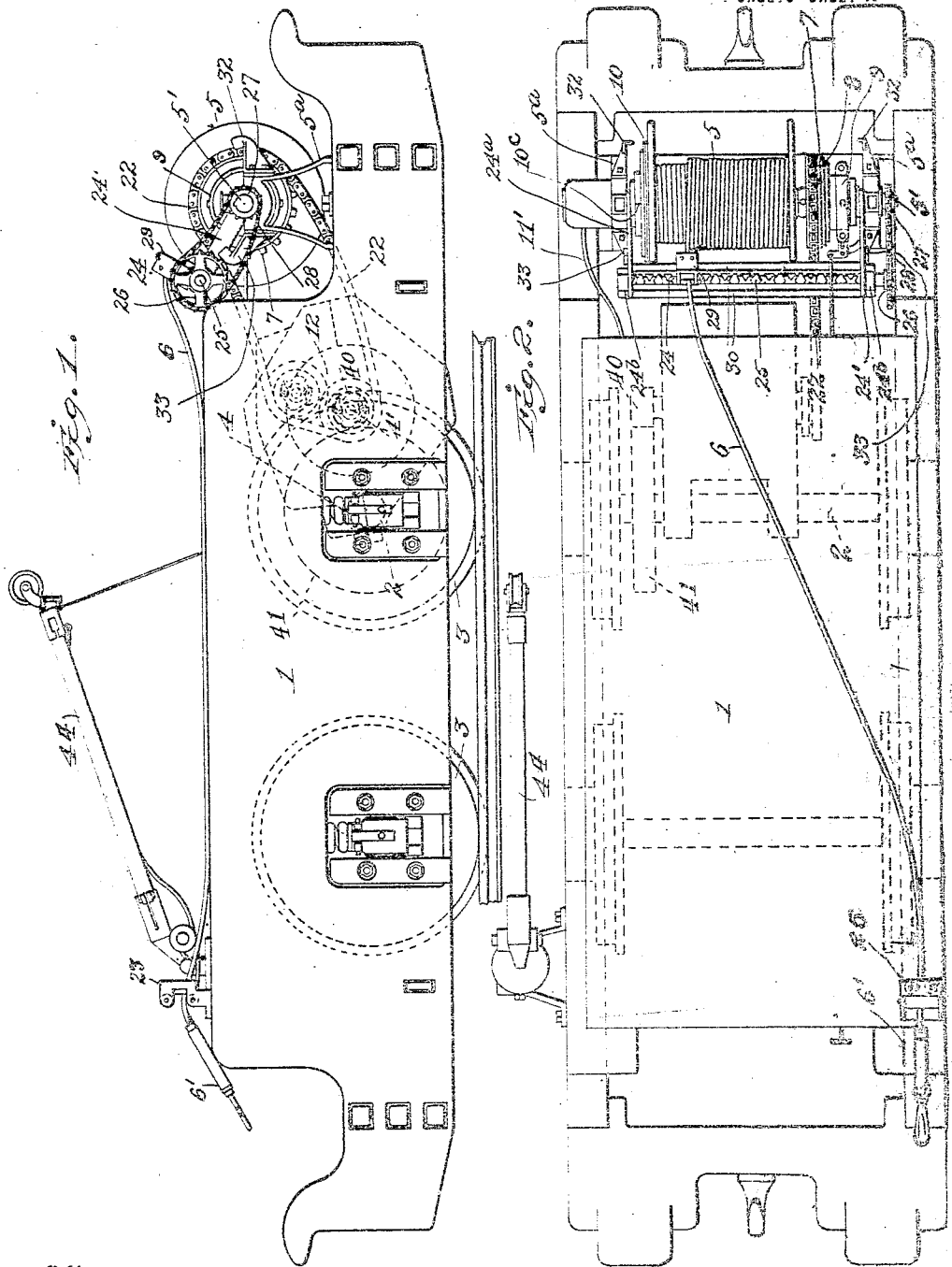

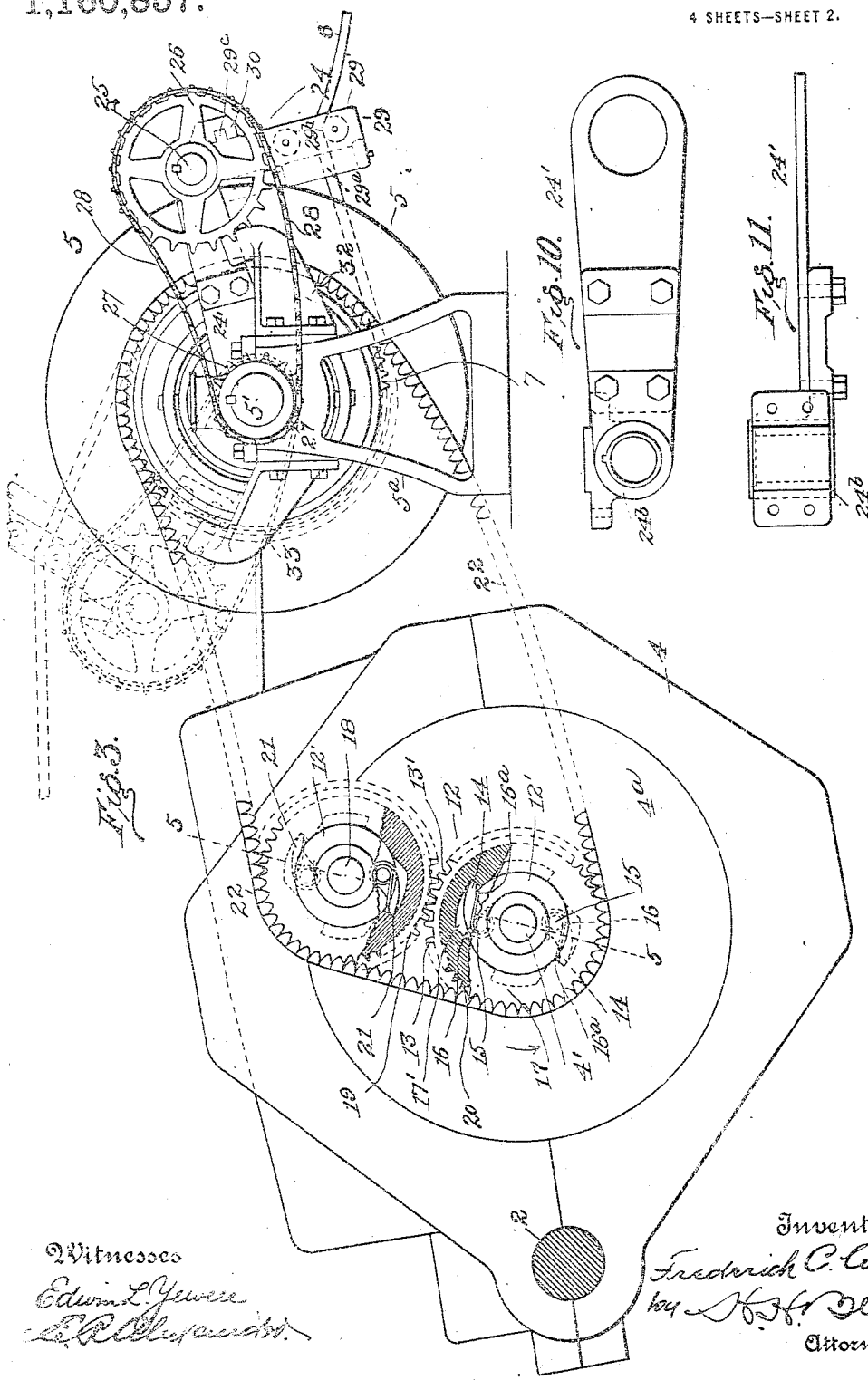

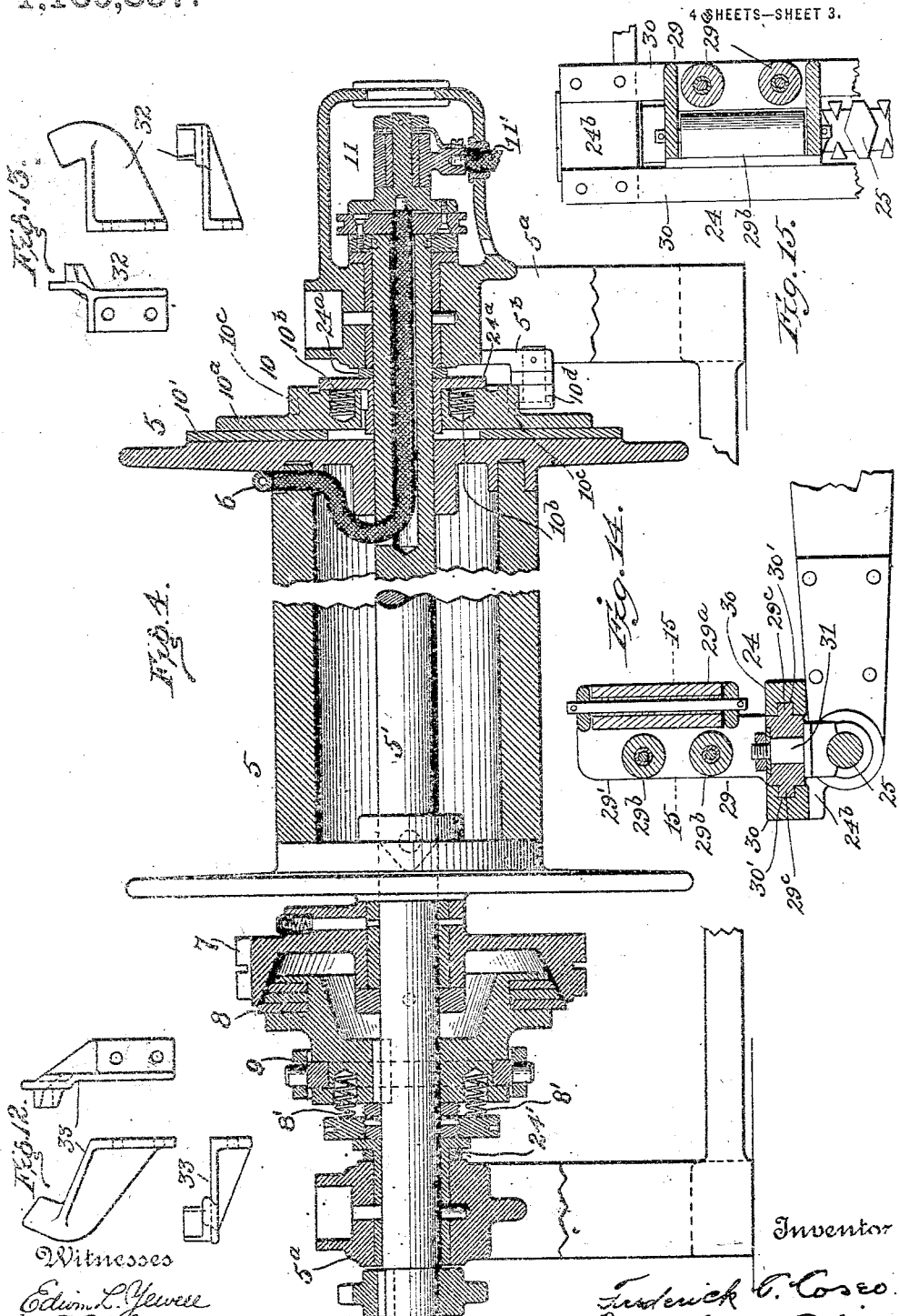

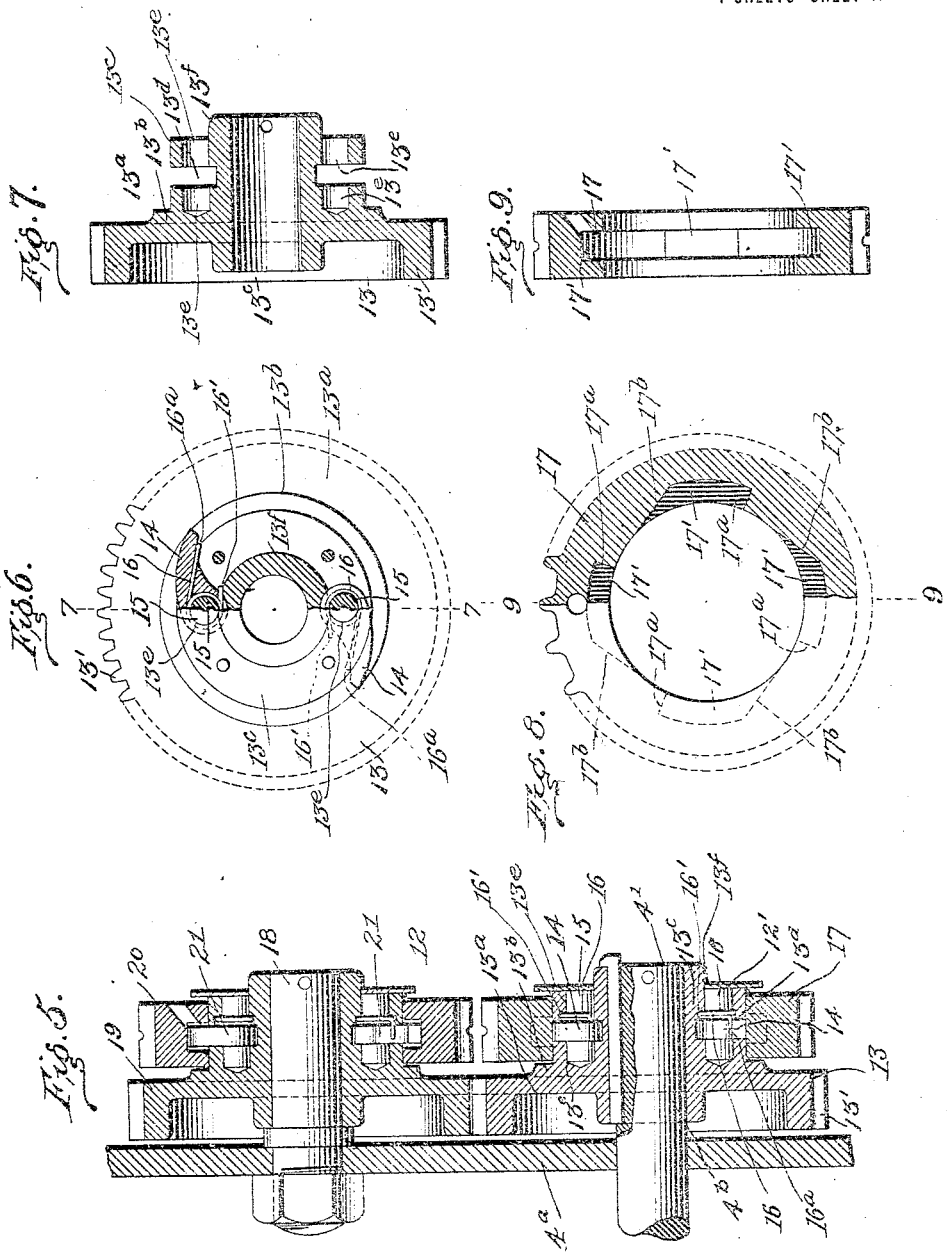

UNITED STATES PATENT OFFICE.

FREDERICK C. COSEO, OF COLUMBUS, OHIO, ASSIGNOR, BY MESNE ASSIGNMENTS, TO THE JEFFREY MANUFACTURING COMPANY, A CORPORATION OF OHIO.

ELECTRIC LOCOMOTIVE AND CABLE-REELING MECHANISM.

1,160,857.     Specification of Letters Patent.     Patented Nov. 16, 1915.

Application filed December 18, 1905, Serial No. 292,336. Renewed August 11, 1908. Serial No. 448,004.

*To all whom it may concern:*

Be it known that I, FREDERICK C. COSEO, a citizen of the United States, residing at Columbus, in the county of Franklin and State of Ohio, have invented certain new and useful Improvements in Electric Locomotives and Cable-Reeling Mechanism, of which the following is a specification, reference being had therein to the accompanying drawings.

This invention relates to electric locomotives and more particularly to means adapted to rotate the cable reel of a locomotive in one direction irrespective of whether the locomotive is moving forward or backward so as to effect the proper winding of the cable upon the reel.

The principal object of the invention is to provide in connection with an electric locomotive a cable reeling mechanism which operates automatically to drive the reel in one direction of rotation irrespective of the direction in which the said locomotive is traveling, and which will be positively operated at all times independently of the direction of rotation of the track wheels of the locomotive or their axles.

Further objects of my invention will be apparent from the description of a device embodying it, which, for the purpose of illustration, I have presented in this application.

Figure 1 is a side elevation of a portion of a locomotive having a cable reel and cable reel driving mechanism embodying my improvements. Fig. 2 is a plan view of the locomotive. Fig. 3 is a side elevation partly in section showing the motor, the reel and the power transmitting mechanism interposed between the motor and the reel. Fig. 4 is a central vertical longitudinal section through the reel and associated parts. Fig. 5 is a section of the ratchet and pawl mechanism taken on the line 5—5 of Fig. 3. Fig. 6 is a side elevation partly in section, showing one of the pawl-carrying gears of the ratchet mechanism, the pawls being shown in position therein. Fig. 7 is a section on the line 7—7 of Fig. 6, the pawls being removed. Fig. 8 is a side elevation partly in section, showing one of the driving sprockets provided with ratchet recesses therein, and Fig. 9 is a section on the line 9—9 Fig. 8. Figs. 10 to 15 show details.

In the drawings 1 respresents an electric locomotive as an entirety, 2 an axle at one end thereof, 3 car wheels on said axle, 4 a motor mounted in the car frame in any suitable manner, 5 a cable reel arranged both to pay out and to wind up a flexible cable 6 by means of which electricity may be conducted to the motor 4 on the car when desired. 44 indicates a trolley mechanism also adapted to conduct electric current to the motor on the car. The motor pinion 40 meshes with the gear wheel 41 on the axle 2, and in this way the motion of the motor is transmitted to the gear wheels to propel the locomotive. As to the elements above referred to, they may be of any suitable and well known type, and for this reason I have not deemed it necessary to describe them in detail.

For purposes of illustration I have shown a reel mechanism similar to that shown in Patent 954,475, issued April 12, 1910, to Frank L. Sessions. In the construction shown the cable reel 5 is carried by a reel shaft 5' mounted in suitable bearings in the standards 5ª on the frame of the locomotive, the reel preferably being rigidly secured to the shaft.

7 is a sprocket wheel loosely mounted on the shaft 5' and through which rotary motion may be imparted for rotating the cable reel 5. Preferably this sprocket wheel has formed integrally with it or secured to it one element of a friction clutch 8, the other element of which is movable relative thereto and is splined to the shaft 5'. 8' are springs adapted normally to press the elements of the friction clutch into operative engagement with each other, and 9 is an operating lever connected to the movable element on the clutch shaft 5'. At the opposite end of the reel from this driving mechanism is arranged a friction retarding device indicated as an entirety by 10. This device is adapted to operate or ' during the paying off of the cable from the reel and preferably consists of a friction plate 10' carried by the reel and a coöperating plate or disk 10ª loosely mounted upon the shaft 5' and held normally in engagement with the plate 10' by the springs 10ᵇ. The plate or disk 10ª carries ratchet teeth 10ᶜ which are adapted to be engaged by a pawl 10ᵈ carried by an arm 5ᵇ secured to the adjacent standard 5ª. This pawl rides over the ratchet teeth when the reel is rotated to wind up the cable thereon, but engages with the teeth and holds the disk or plate 10ª stationary when the reel is rotated in the opposite direction to pay out the cable. During this paying off of the cable from the reel the friction retarding device 10 will consequently operate to oppose the rotation of the reel.

The cable 6 is preferably led inward through the periphery of the reel and thence out through the hollowed end of the shaft 5', and is electrically connected to the electric collector at 11. From thence the current is conducted to the motor by the conductor 11'.

12 indicates as an entirety the mechanism by means of which rotary motion always in one direction is imparted from the motor to the sprocket wheel 7 and hence to the reel irrespective of the direction of rotation of the armature shaft 4' of the motor and the consequent direction of travel of the locomotive. The motor 4 is preferably arranged with its armature shaft 4' extended beyond one side 4ª of the motor casing, as indicated at 4ᵇ in Fig. 5. Of this mechanism, 13 is a gear wheel rigidly secured to the extended end 4ᵇ of the armature shaft 4'. Preferably this gear wheel is formed as shown in the drawings so as to comprise a toothed rim part 13' carried by a web 13ª, from which projects laterally outward the boss 13ᵇ and the hub-like part 13ᶜ. The periphery of this hub-like portion 13ᶜ is annularly recessed at 13ᵈ, and transversely of this recess and at either side thereof the metal of the hub is bored out as indicated at 13ᵉ, 13ᵉ at points diametrically opposite to each other. Within this recess 13ᵈ are mounted swinging pawls 14, each carried by a hinge pin 15 snugly fitted into the alined holes 13ᵉ at either side of the recess. 16 are coiled springs encircling the said pins 15 at one side of the pawls thereon, and each bearing at one end 16' against the metal of the hub of the wheel and at the other end 16ª against the outer free end of one of the pawls and adapted normally to press or swing the said pawl outwardly about the axis of its pivotal connection.

The hinge pins 15 are preferably held against lateral movement within the hub by means of a retaining plate 12' mounted upon the reduced part 13ᶠ of the hub 13ᶜ and detachably secured to the outer face of the hub in any suitable manner.

17 indicates a sprocket wheel loosely mounted on the hub 13ᶜ of the gear wheel 13. The inner cylindrical surface of this sprocket wheel 17 is recessed at regular intervals as indicated at 17', these recesses being adapted to receive the pawls 14. Each of the recesses has at one end a radial wall 17ª which serves as a ratchet tooth or surface with which the free end of one of the pawls 14 will engage when the gear 13 rotates in one direction and will thus effect the rotation of the sprocket 17. At its opposite end each recess has a non-radial wall 17ᵇ over which the pawls 14 are adapted to ride without engaging the sprocket 17 in such manner as to transmit power thereto for operating it. In other words, I have simply interposed between the gear wheel 13 and the sprocket wheel 17 a ratchet and pawl mechanism adapted to operate to effect the rotation together of the said wheels in one direction, while permitting the gear wheel 13 to rotate relatively to the said sprocket wheel when the gear wheel is turned in the opposite direction.

18 is a counter or stub shaft secured to the end wall 4ª of the motor casing and extending therefrom in the same direction as and parallel to the extended end 4ᵇ of the armature shaft. 19 is a gear wheel loosely mounted on said shaft 18. This gear wheel is identically similar in structural detail to the gear wheel 13 with which it meshes and by which it is rotated. The gear 19 has loosely mounted upon it a sprocket 20 which is similar in every particular to the sprocket 17 carried by the gear 13. Ratchet and pawl mechanism indicated as an entirety by 21 is interposed between the gear wheel 19 and the sprocket wheel 20 and as it is similar in every particular to the ratchet and pawl mechanism between the gear wheel 13 and the sprocket wheel 17, it is not necessary to further describe it.

22 is a power transmitting chain connecting the sprockets 17 and 20 with the sprocket wheel 7 on the reel shaft. This chain extends as shown from the said sprocket wheel 7 to the sprocket wheel 17, thence to the sprocket wheel 20 and thence returns to the sprocket wheel 7.

The operation of the train of power transmitting devices interposed between the armature shaft 4' and the reel will be readily apparent.

For the purpose of description, I will refer to one end of the locomotive as the operator's end and the other end of the locomotive as the reel end. Assuming that the locomotive has reached a point from which it is desired to supply current to the locomotive through the cable 6 instead of through the trolley mechanism, and that the reel end of the locomotive is nearest to the said fixed point and the cable is to be paid off from that end as the locomotive moves away from the said point; the free end 6' of the flexible cable is electrically connected to the current supply circuit at the fixed point, and power is applied to actuate the motor 4 so as to cause the locomotive to travel away from said point. During this operation of the locomotive the elements of the friction clutch 8 may be disconnected. The pawl 10ᵃ will engage with one of the ratchet teeth 10ᶜ carried by the plate 10ᵃ and will hold the said plate stationary. This will insure that as the reel 5 is rotated to pay out the cable sufficient frictional resistance will be set up between the plate 10ᵇ and the plate 10' to prevent the running away of the reel and consequent back-lashing of the cable, and will insure sufficient tension on the cable as it is paid off from the reel to lay it in the manner desired. When the locomotive has traveled the required distance from the fixed point and it is desired to return to or toward it, the operator, if necessary, shifts the clutch controlling lever 9 so as to make forced engagement of the elements of the friction clutch 8 and to establish driving communication between the armature shaft 4' and the reel shaft. Current is then supplied to the motor so as to cause it to effect the travel of the locomotive toward said fixed point. The reel end of the locomotive will then be in advance and will be running toward the paid out cable. Referring to Fig. 3, we will assume that during this operation of the locomotive the armature shaft 4' is rotating in counter clockwise direction, this will cause the gear wheel 13 to rotate in counter-clockwise direction and the pawl 14 carried thereby will run freely within the sprocket wheel 17, and consequently this sprocket wheel will not tend to drive the chain 22. The gear wheel 13, however, will drive the gear wheel 19 in clockwise direction and the ratchet and pawl mechanism interposed between the said gear wheel 19 and the sprocket 20 will be active to effect the positive rotation of said sprocket wheel and consequently the chain 22 will be driven by the sprocket wheel 20 in such manner as to cause the clockwise rotation of the driven sprocket 7 on the reel shaft, which in turn through the friction clutch mechanism 8 will rotate the reel 5 so as to wind up the cable. It will be noted that should the tension upon the cable as it is being wound up exceed a predetermined amount, slippage will occur between the elements of the friction clutch 8 so as to compensate therefor and thus relieve the cable of severe strain and prevent its breaking.

Now assuming that instead of paying off the cable from the reel end, the locomotive is traveling away from the fixed point with the operator's end nearest the said point. It is then essential that the cable should be paid off from the operator's end of the machine. For this purpose the cable 6 will be carried back from the reel 5 across the top of the locomotive and through a suitable cable guiding mechanism 23, and its free end 6' will be electrically connected to the current supply system as before. As the locomotive under these conditions travels away from the fixed point, the clutch mechanism at 8 having been disconnected, if desired, the cable is paid off from the reel exactly as in the first instance, the friction retarding mechanism 10 for the reel operating similarly irrespective of whether the cable is paid off from the reel end of the machine or from the operator's end. When it is now desired to return toward the fixed point, assuming that the gear wheel 13 will be rotated in clockwise direction instead of in counter-clockwise direction as in the first instance, and the friction clutch mechanism at 8 having, if necessary, been thrown into operation, the ratchet and pawl mechanism between the said gear wheel 13 and the sprocket wheel 17 will operate to cause the positive rotation of the said sprocket wheel and consequently the driving of the transmission chain 22 in the same direction that it was driven when the reel end of the machine was running toward the paid out cable as above described; the driven sprocket 7 on the reel shaft will be rotated in clockwise direction as before and the reel through the friction clutch 8 will be rotated so as to wind up the cable.

In the drawings I have shown the reel mounted on a horizontal shaft, but it will be understood that my invention may be applied as well to a vertically mounted reel as to a horizontally mounted one. Where the mounting is of a horizontal nature such as illustrated in the drawings, it is desirable that some sort of a cable spooling and guiding mechanism be provided for directing the cable onto the reel, and where such spooling and guiding mechanism is used, it is essential that it be adapted to operate to properly direct the cable on the reel irrespective of which end of the locomotive is moving in advance toward the paid out cable. For this purpose I have provided a cable spooling and guiding mechanism which is indicated as an entirety by 24. The mechanism illustrated is similar to that shown in Patent 959,621, issued May 31, 1910, to Frank L. Sessions. Of this mechanism 24', 24ᵃ indicate arms loosely mounted upon the reel shaft 5', each one preferably being adjacent to one of the standards 5ᵃ. At their outer ends each of these arms carries a bearing block or plate 24ᵇ. 25 is a double threaded shaft arranged parallel to the reel shaft 5' and mounted at either end in bearings in the adjacent bearing block 24ᵇ. This double threaded shaft extends through the bearing block 24ᵇ at the friction clutch end of the reel and has secured to it a sprocket wheel 26. 27 is a sprocket wheel arranged in alinement with the sprocket wheel 26 and secured to the reel shaft 5'. 28 is a driving chain connecting the sprockets 26 and 27. 29 indicates as an entirety a traveler adapted to travel to and fro along said double threaded shaft as it is rotated by the reel shaft. This traveler comprises a frame 29' adapted to carry within it a pair of longitudinally mounted rollers 29$^a$ and a pair of transversely mounted rollers 29$^b$. The rollers of each of these pairs of rollers are adapted to receive between them and to guide the cable 6. At one end and on opposite sides this cable guide frame has transversely extending ribs 29$^c$ which are adapted to engage with the walls of the grooves 30' in the traveler guides 30 which are arranged at either side of the traveler and have their ends carried by and secured to the bearing blocks 24$^b$.

31 is a follower stud pivotally mounted in the cable guide frame 29' and having a projection adapted to engage the walls of the threads on the double threaded shaft and to direct the traveler frame to and fro along said shaft.

When the cable is to be paid off from and wound up upon the reel from the reel end of the locomotive, it is desirable to have the cable spooling and guiding mechanism arranged as shown in full lines in Fig. 3, so that the traveler 29 for guiding the cable onto the reel will be in front of the reel. To hold the cable spooling and guiding mechanism in this position I have provided brackets 32 arranged at either side of the reel supporting structure, each secured to an adjacent standard 5$^a$ and each adapted to engage with and support one of the bearing plates 24$^b$. When it is necessary to pay out and reel up the cable from the operator's end of the locomotive, the cable spooling and guiding mechanism may be swung to the position indicated in dotted lines in Fig. 3, in which case the cable guiding traveler is still in front of the reel when the direction of travel of the reel is considered. For maintaining the spooling and guiding mechanism in this position I have provided brackets 33 each arranged at one end of the reel supporting frame, each secured to the adjacent standard 5$^a$ and each adapted to engage and support one of the bearing plates 24$^b$.

The transversely arranged guide and supporting rollers carried by the traveler frame 29' are so arranged that one of them will support the flexible cable when the spooling and guiding mechanism is in one position while the other will support the cable when the said mechanism is in its other position.

I am aware of the fact that it has been proposed to construct a cable reeling mechanism for an electric locomotive in which mechanism was provided for effecting the rotation of the reel in one direction to wind up the cable upon the reel irrespective of which end of the locomotive was traveling in advance toward the paid out cable. In this suggested construction, however, it was necessary, each time that a change was made to pay out and reel up the cable either from the reel end of the locomotive or from the operator's end of the locomotive, for the operator to manually throw into or out of operation one or another of two trains of power transmitting devices, each of which was adapted to rotate the reel in one direction only. In the event of the operator forgetting to make these changes in the transmission system at the required time, the reeling mechanism would fail to operate as desired and great danger resulted of breaking or seriously injuring the flexible cable.

I believe that I am the first to devise a mechanism which automatically operates to effect the rotation of the reel always in one direction irrespective of the direction of rotation of the rotary element from which power is taken to drive the said reel.

The friction retarding mechanism 10 is adapted under all ordinary circumstances to automatically control the reel in its rotation in unwinding direction. And under most circumstances it will be found best to manually disconnect the clutch mechanism at 8. But while this is the ordinary operation of the mechanism of my invention, it is desirable to be able to manually control the unwinding of the reel by means supplementary to the automatic friction retarding device 10. This automatic brake 10 applies a braking effect of predetermined amount and it often happens that because of the rapid deceleration of the locomotive, or because of the improper or defective operation of the automatic brake 10 additional braking means must be brought into action by the operator. This is accomplished by the simple expedient of throwing the clutch 8 into operative position during the unwinding of the reel. The lever 9 controls the degree of pressure existing between the elements of the clutch 8 and consequently the extent to which the driving element of the clutch will act as a brake to retard the driven element. Because the sprocket wheel 7 always rotates in a direction tending to wind up the reel, the elements of the clutch 8 will rotate in opposite directions when the reel is rotataing in the unwinding direction. As a result the clutch element which is connected with the motor constantly tends to reverse the rotation of the reel and, therefore, effectively serves to maintain proper cable tension at all times. If, for any reason, there is any acceleration of the reel such that the cable becomes slack, this constantly rotating clutch element at once acts to rewind the cable and restore the proper tension.

What I claim is:—

1. In a vehicle of the class described having an electric cable reeling mechanism, the combination with a truck provided with a rotatable shaft connected so as to rotate in either direction according to the direction of travel of the truck, of a cable reel arranged to travel with the truck, a flexible conductor cable wound upon the reel and adapted to have its free end secured to a fixed conductor, and reel driving and controlling means interposed between the rotatable shaft and the reel and constructed to be automatically actuated to cause the rotation of the reel always in the winding direction irrespective of the direction of rotation of the rotatable shaft, the said means being adapted to permit rotation of the reel in the unwinding direction under cable tension.

2. In a vehicle of the class described having an electric cable reeling mechanism, the combination with a truck provided with a rotatable shaft connected so as to rotate in either direction according to the direction of travel of the truck, of a cable reel, a flexible conductor cable wound upon the reel and adapted to have its free end secured to a fixed conductor, and reel driving and controlling means interposed between the rotatable shaft and the cable reel adapted to permit the unwinding of the cable and comprising two power transmitting members, one constructed to be automatically thrown into operation to transmit power from the rotatable shaft when rotating in one direction to the reel for rotating it in the winding direction, and the other constructed to be automatically thrown into operation to transmit power from the rotatable shaft when rotating in the opposite direction to the reel for rotating it also in the winding direction.

3. In a vehicle of the class described having an electric cable reeling mechanism, the combination with a truck provided with a rotatable shaft connected so as to rotate in either direction according to the direction of travel of the truck, of a cable reel arranged to travel with the truck, a flexible conductor cable wound upon the reel and adapted to have its free end secured to a fixed conductor, and a train of power transmitting elements adapted to permit the unwinding of the cable and comprising two coöperating power transmitting members, one active while the other is inactive and each constructed to be automatically thrown into operation to transmit power from the rotatable shaft to rotate the cable reel in the winding direction.

4. In a vehicle of the class described having an electric cable reeling mechanism, the combination with a truck provided with a rotatable shaft connected so as to rotate in either direction according to the direction of travel of the truck, of a cable reel arranged to travel with the truck, a flexible conductor cable wound upon the reel and adapted to have its free end secured to a fixed conductor, and a train of power transmitting elements interposed between the rotatable shaft and the cable reel adapted to permit the unwinding of the cable and comprising two sprocket wheels each adapted to transmit power for rotating the reel in the winding direction, means for automatically throwing one of the sprocket wheels into operation for rotating the reel in the winding direction when the rotatable shaft is rotating in one direction, and means for automatically throwing the other sprocket wheel into operation for rotating the reel in the winding direction when the rotatable shaft is rotating in the other direction.

5. In a vehicle of the class described having an electric cable reeling mechanism, the combination with a truck provided with a rotatable shaft connected so as to rotate in either direction according to the direction of travel of the truck, of a cable reel arranged to travel with the truck, a flexible conductor cable wound upon the reel and adapted to have its free end secured to a fixed conductor, and a train of power transmitting elements interposed between the rotatable shaft and the cable reel adapted to permit the unwinding of the cable, and comprising two sprocket wheels each adapted to rotate the reel in the winding direction, ratchet and pawl devices for each of said sprocket wheels, and gearing connecting the ratchet and pawl devices together.

6. In a vehicle of the class described, having an electric cable reeling mechanism, the combination with a truck provided with a rotatable shaft connected so as to rotate in either direction according to the direction of travel of the truck, of a cable reel arranged to travel with the truck, a flexible conductor cable wound upon the reel and adapted to have its free end secured to a fixed conductor, and a train of power transmitting elements interposed between the rotatable shaft and the reel adapted to permit the unwinding of the cable and comprising two sprocket wheels, each adapted to rotate the cable reel in the winding direction, ratchet and pawl devices for each of the sprocket wheels, and means for automatically actuating the ratchet and pawl devices in order to cause the operation of one or the other of the sprocket wheels irrespective of the direction of rotation of the rotatable shaft.

7. In a vehicle of the class described having an electric cable reeling mechanism, the combination with a truck provided with a rotatable shaft connected so as to rotate in either direction according to the direction of travel of the truck, of a cable reel, a flexible conductor cable wound upon the reel and adapted to have its free end secured to a fixed conductor, a friction retarding device adapted to oppose the rotation of the reel in the cable paying out direction, and reel driving and controlling means interposed between the rotatable shaft and the reel and constructed to be automatically actuated to rotate the reel always in the winding direction irrespective of the direction of rotation of the rotatable shaft, the said means comprising a manually controllable clutch.

8. In an electric locomotive having a cable reeling mechanism, the combination with a locomotive truck, a motor thereon, and power transmitting devices between the motor and the truck wheels, of a cable reel, a flexible cable wound upon the reel and adapted to have its free end secured to a fixed conductor, a cable spooling and guiding device adjustable to a position on either side of the reel, and reel driving and controlling means interposed between the motor and the reel and constructed to be automatically actuated to rotate the reel always in the winding direction irrespective of the direction of rotation of the armature shaft of the motor, the said means comprising two frictionally engaging elements.

9. In a vehicle of the class described having an electric cable reeling mechanism, the combination with a truck provided with a rotatable shaft operatively connected to the track engaging wheels, of a cable reel mounted to travel with the truck, a flexible conductor cable wound upon the reel and adapted to have its free end secured to a fixed conductor, an auxiliary shaft, a unidirectional drive clutch upon the said rotatable shaft, gearing connecting the said rotatable shaft with the said auxiliary shaft, a second unidirectional drive clutch mounted upon the auxiliary shaft, and power transmitting connections between each of the clutches and the cable reel adapted to permit the unwinding of the cable, both of the clutches being adapted to drive the reel in the winding direction.

10. In a vehicle of the class described having an electric cable reeling mechanism, the combination with a truck provided with a rotatable shaft operatively connected to the track engaging wheels, of a cable reel mounted to travel with said locomotive, a flexible conductor cable wound upon the reel and adapted to have its free end secured to a fixed conductor, an auxiliary shaft arranged parallel to the said rotatable shaft, a uni-directional drive clutch upon the said rotatable shaft, gearing connecting the said rotatable shaft with the said auxiliary shaft, a second uni-directional drive clutch mounted upon the auxiliary shaft, and power transmitting connections between each of the clutches and the cable reel adapted to permit the unwinding of the cable, both of the clutches being adapted to drive the reel in the winding direction.

11. In a vehicle of the class described having an electric cable reeling mechanism, the combination with a truck provided with a rotatable shaft connected so as to rotate in either direction according to the direction of travel of the truck, of a cable reel arranged to travel with said locomotive and mounted axially parallel with the rotatable shaft, a flexible conductor cable wound upon the reel and adapted to have its free end secured to a fixed conductor, and a train of power transmitting elements interposed between the rotatable shaft and the reel adapted to permit the unwinding of the cable and comprising devices constructed to be automatically thrown into operation to cause the rotation of the said reel always in the winding direction irrespective of the direction of rotation of the rotatable shaft.

12. In a vehicle of the class described having an electric cable reeling mechanism, the combination with a truck and a power device connected to drive the truck, of a cable reel arranged to travel with the truck, a flexible conductor cable wound upon the reel and adapted to have its free end secured to a fixed conductor, two reel driving wheels mounted with their disks lying in the same plane and adapted to be driven by the power device in the same given direction, one of the driving wheels being adapted to be driven when the vehicle is moving in one direction and the other when it is moving in the other direction, a driven wheel mounted upon the reel in the plane of the said driving wheels and geared thereto, and a clutch interposed in the train of power elements between the motor and the reel.

13. In an electric locomotive having a cable reeling mechanism, the combination with a locomotive truck and a motor geared to the supporting wheels, of a cable reel, a flexible conductor cable wound upon the reel and adapted to have its free end secured to a fixed conductor, a friction clutch, a connection interposed between the said motor and one element of the clutch for driving the said element always in one direction irrespective of the direction of rotation of the motor, means for throwing the other element of the clutch into or out of engagement with the first element, and means for connecting the said second element with the reel to rotate the reel always in the winding direction when the elements are in engagement, the said elements when engaged acting as a brake to retard the rotation of the reel in the unwinding direction when the locomotive is moving away from the said fixed conductor.

14. In combination, a vehicle adapted to move in forward and reverse directions, a winding device carried by said vehicle, an electric motor, means for transmitting the power of the motor to drive the vehicle, power transmitting elements connecting the motor with said winding device, said power transmitting elements being constructed and arranged to be automatically actuated to exert a winding torque upon the winding device during the movement of the vehicle in either direction.

In testimony whereof I affix my signature, in presence of two witnesses.

FREDERICK C. COSEO.

Witnesses:
H. E. BUELL.
C. L. McCONKEY.